(12) United States Patent
Lin et al.

(10) Patent No.: US 11,917,168 B2
(45) Date of Patent: Feb. 27, 2024

(54) IMAGE ENCODING AND DECODING METHODS, IMAGE PROCESSING DEVICE, AND COMPUTER STORAGE MEDIUM

(71) Applicants: TONGJI UNIVERSITY, Shanghai (CN); ZTE CORPORATION, Guangdong (CN)

(72) Inventors: Tao Lin, Shanghai (CN); Ming Li, Guangdong (CN); Ping Wu, Guangdong (CN); Guoqiang Shang, Guangdong (CN); Zhao Wu, Guangdong (CN)

(73) Assignees: TONGJI UNIVERSITY (CN); ZTE CORPORATION (CN)

( * ) Notice: Subject to any disclaimer, the term of this patent is extended or adjusted under 35 U.S.C. 154(b) by 0 days.

(21) Appl. No.: 17/902,022

(22) Filed: Sep. 2, 2022

(65) Prior Publication Data
US 2022/0417535 A1      Dec. 29, 2022

Related U.S. Application Data

(63) Continuation of application No. 15/580,893, filed as application No. PCT/CN2016/084992 on Jun. 6, 2016, now abandoned.

(30) Foreign Application Priority Data

Jun. 8, 2015   (CN) .......................... 201510308146.7
May 27, 2016  (CN) .......................... 201610364374.0

(51) Int. Cl.
*H04N 19/176* (2014.01)
*H04N 19/182* (2014.01)
(Continued)

(52) U.S. Cl.
CPC .......... *H04N 19/176* (2014.11); *H04N 19/17* (2014.11); *H04N 19/182* (2014.11);
(Continued)

(58) Field of Classification Search
None
See application file for complete search history.

(56) References Cited

U.S. PATENT DOCUMENTS 7,944,451 B2   5/2011  Hochmuth
8,134,573 B2   3/2012  Nguyen et al.
(Continued)

FOREIGN PATENT DOCUMENTS

CN    101340587     1/2009
CN    102497546     6/2012
(Continued)

OTHER PUBLICATIONS

Zhan Ma, Wei Wang, Meng Xu, Xian Wang, Haoping Yu, "Description of screen content coding technology proposal by Huawei", Joint Collaborative Team on Video Coding (JCT-VC) of ITU-T SG16 WP3 and ISO/IEC JTC1/SC29/WG11 17th Meeting: Valencia, ES, Mar. 27-Apr. 4, 2014 (Year: 2014).*

(Continued)

*Primary Examiner* — Xiaolan Xu
(74) *Attorney, Agent, or Firm* — McDonald Hopkins LLC

(57) ABSTRACT

Disclosed are an image encoding and decoding method, image processing device, and computer storage medium. the image coding method includes: when copying coding is performed on a current coding block by using one of the at least two different palette and pixel string copying coding manners, generating a new palette color according to pixels of the current coding block; generating a palette for the current coding block according to the new palette color and a palette color candidate set shared by the at least two (Continued)

different palette and pixel string copying coding manners; and performing palette and pixel string copying coding by using the palette for the current coding block, and generating a video bitstream comprising a copying manner and a copying parameter.

20 Claims, 7 Drawing Sheets

(51) Int. Cl.
*H04N 19/186* (2014.01)
*H04N 19/593* (2014.01)
*H04N 19/17* (2014.01)
*H04N 19/70* (2014.01)

(52) U.S. Cl.
CPC ......... *H04N 19/186* (2014.11); *H04N 19/593* (2014.11); *H04N 19/70* (2014.11)

(56) References Cited

U.S. PATENT DOCUMENTS

| | | | |
|---|---|---|---|
| 9,183,643 | B2 | 11/2015 | Matsumura |
| 10,182,242 | B2 | 1/2019 | Sun et al. |
| 10,469,848 | B2 | 11/2019 | Lai et al. |
| 2009/0010533 | A1 | 1/2009 | Hung |
| 2009/0033670 | A1 | 2/2009 | Hochmuth |
| 2010/0214315 | A1 | 8/2010 | Nguyen |
| 2014/0064612 | A1 | 3/2014 | Matsumura et al. |
| 2015/0312573 | A1* | 10/2015 | Bugdayci ............... H04N 19/70 375/240.02 |
| 2016/0309183 | A1* | 10/2016 | Sun ....................... H04N 19/182 |
| 2016/0316213 | A1* | 10/2016 | Lai ....................... H04N 19/186 |

FOREIGN PATENT DOCUMENTS

| | | |
|---|---|---|
| CN | 203492155 | 3/2014 |
| CN | 104244007 | 12/2014 |
| WO | 2015090217 | 6/2015 |
| WO | 2015090219 | 6/2015 |
| WO | 2015094711 | 6/2015 |
| WO | 2015096647 | 7/2015 |
| WO | 2015103980 | 7/2015 |
| WO | 2015113510 | 8/2015 |
| WO | 2015135484 | 9/2015 |
| WO | 2015135509 | 9/2015 |

OTHER PUBLICATIONS

Lin et al., "Non-CE1: Enhancement to Palette Coding by Palette with Pixel Copy Coding," JCT-VC Meeting; Jun. 19, 2015; Warsaw; No. JCTVC-U0116, Jun. 10, 2015, XP030117555.
European Patent Office, Notification of Office Action for Application No. 16806791.6, dated Dec. 16, 2021, 11 pages.
International Search Report in international application No. PCT/CN2016/084992, dated Aug. 26, 2016.
Xiu, Xiaoyu et al., "Palette-based Coding in the Screen Content Coding Extension of the HEVC Standard", Proceedings of The 2015 Data Compression Conference, Apr. 9, 2015 (Apr. 9, 2015), ISSN: 1068-0314, pp. 253-262.
Ma Z et al.: "Description of screen content coding technology proposal by Huawei Technologies (USA)", 17. JCT-VC Meeting; Mar. 27, 2014-Apr. 4, 2014; Valencia; (Joint Collaborative Team On Video Coding of ISO/IEC JTC1/SC29/WG11 and ITU-T SG. 16): URL: http://wftp3.itu.int/av-arch/jctvc-site/,, No. JCTVC-Q0034-v4, J7 Mar. 2014 (Mar. 27, 2014), XP030115922,* sections 1-3 *.
He Y et al: "Non-CE1: on palette sharing mode", 20. JCT-VC Meeting; Oct. 2, 2015-Feb. 18, 2015; Geneva; (Joint Collaborative Team on Video Coding of ISO/IEC JTC1/SC29/WG11 and ITU-T SG. 16); URL: http://wftp3.itu.int//av-arch/jctvc-site/,, No. JCTV-T0206, Feb. 9, 2015 (Feb. 9, 2015, XP030117375, * abstract * section 1 *.
Jzheng Xu, Rajan Joshi, Robert A. Cohen. Overview of Emerging HEVC Screen Content Coding Extension, IEEE Transactions on Circuits and Systems for Video Technology, vol. 26, No. 1, pp. 50-62, Jan. 2016.
Supplementary European Search Report in European application No. 16806791.6, dated Mar. 27, 2018.

* cited by examiner

IMAGE ENCODING AND DECODING METHODS, IMAGE PROCESSING DEVICE, AND COMPUTER STORAGE MEDIUM

CROSS-REFERENCES TO RELATED APPLICATION

This application is a Continuation application of U.S. patent application Ser. No. 15/580,893, which is a U.S. National Stage Application of International Patent Application No. PCT/CN2016/084992 filed on Jun. 6, 2016, which claims priority to Chinese patent application No. 201510308146.7 filed on Jun. 8, 2015 and No. 201610364374.0 filed on May 27, 2016, disclosures of which are incorporated herein by reference in their entireties.

TECHNICAL FIELD

The disclosure relates to digital video coding and decoding techniques, and particularly to image coding and decoding methods, image processing devices and a computer storage medium.

BACKGROUND

Along with development of a television and a display into resolutions of super-high definition (4K) and extra super-high definition (8K) and development and popularization of a new-generation cloud computing and information processing mode and platform adopting a remote desktop as a typical representation form, a video compression requirement is also made for a higher-resolution composite image (or picture) including an image shot by a camera and a computer screen image. It becomes a indispensable technology of video coding for achieving an ultrahigh-compression ratio and extremely high-quality data compression.

Performing ultrahigh-efficiency compression on a video by fully utilizing characteristics of a 4K/8K image and a computer screen image is also a main objective of a latest international video compression standard High Efficiency Video Coding (HEVC) as well as other international standards, national standards and industrial standards.

An outstanding characteristic of a computer screen image is that there may usually be many similar and even completely the same pixel patterns in the same image. For example, a Chinese or foreign character frequently appearing in a computer screen image is formed by a few basic strokes, and many similar or the same strokes may be found in the same frame of image. A common menu, icon and the like in a computer screen image also have many similar or the same patterns. Therefore, various copying manners are usually adopted in an existing image and video compression technology, at least including the following copying manners:

1) intra block copying, i.e. intra block matching or called as intra motion compensation or called as block matching or called as block copying;
2) intra micro-block copying, i.e. intra micro-block matching or called as micro-block matching or called as micro-block copying;
3) intra line (called as line for short) copying, i.e. intra line matching or called as line matching or called as line copying;
4) intra string copying, i.e. intra string matching or called as string matching or called as string copying or called as pixel string copying;
5) palette index string copying, i.e. palette or called as index string copying;
6) a mixed copying manner by mixing index string copying and pixel string copying, called as an index-pixel string mixed copying manner for short, also called as a palette-pixel string mixed copying manner or a palette manner mixing pixel string copying or a pixel string copying manner mixing palette or a palette and pixel string copying manner; and
7) a multiple palette and pixel string copying manner combining multiple palette and pixel string copying manners.

Among the existing copying manners, the multiple palette and pixel string copying manner achieves the best compression effect. However, in the multiple palette and pixel string copying manner of a conventional art, palette and pixel string copying manner has a respectively independent palette color candidate set, and if a coding block and a decoding block do not adopt the same palette and pixel string copying manner, a palette color candidate set corresponding to the palette and pixel string copying manner may not be updated, and there is no new more suitable palette colors supplemented to the corresponding palette color candidate set. Such a method greatly reduces compression efficiency of the multiple palette and pixel string copying manner.

SUMMARY

In order to solve the technical problem, embodiments of the disclosure provide image coding and decoding methods, image processing devices and a computer storage medium.

An embodiment of the disclosure provides an image coding method, which may include that:

when copying coding is performed on a current coding block by using one of palette and pixel string copying coding manners, a new palette color is generated according to pixels of the current coding block;

a palette for the current coding block is generated according to the new palette color and/or a palette color candidate set shared by the palette and pixel string copying coding manners; and palette and pixel string copying coding is performed by using the palette for the current coding block, and a video bitstream including a copying manner and a copying parameter is generated.

In the embodiment of the disclosure, the coding block may be a coding region of an image, and the coding block may include at least one of: a Largest Coding Unit (LCU), a Coding Tree Unit (CTU), a Coding Unit (CU), a sub-region of the CU, a Prediction Unit (PU) and a Transform Unit (TU).

In the embodiment of the disclosure, the video bitstream may further include the new palette color.

In the embodiment of the disclosure, a maximum number of palette colors which may be accommodated by a largest space of the palette color candidate set may be a predetermined constant.

In the embodiment of the disclosure, the method may further include that: one or more of the following operations are performed on the palette color candidate set according to a predetermined rule:

updating, palette color deletion, palette color position regulation and palette color addition.

In the embodiment of the disclosure, addition of the new palette color and/or deletion of existing palette colors may be performed on the palette color candidate set according to a first-in-first-out rule.

In the embodiment of the disclosure, the method may further include that:

for the coding block coded by using one of palette and pixel string copying manners, part or all of the new palette color of the coding block are added into the shared palette color candidate set.

An embodiment of the disclosure provides an image decoding method, which may include that:

a video bitstream is parsed to acquire at least one of: a copying manner for palette and pixel string copying decoding, a copying parameter and a new palette color;

a palette used when palette and pixel string copying decoding is performed on a current decoded block by using the copying manner is generated according to the new palette color and/or a palette color candidate set shared by palette and pixel string copying decoding manners; and palette and pixel string copying decoding is performed by using the palette for the current decoded block.

In the embodiment of the disclosure, the decoded block may be a decoding region of an image, and the decoded block may include at least one of: an LCU, a CTU, a CU, a sub-region of the CU, a PU and a TU.

In the embodiment of the disclosure, a maximum number of palette colors which may be accommodated by a largest space of the palette color candidate set may be a predetermined constant.

In the embodiment of the disclosure, the method may further include that: one or more of the following operations are performed on the palette color candidate set according to a predetermined rule:

updating, palette color deletion, palette color position regulation and palette color addition.

In the embodiment of the disclosure, addition of the new palette color and/or deletion of existing palette colors may be performed on the palette color candidate set according to a first-in-first-out rule.

In the embodiment of the disclosure, the method may further include that:

for the decoded block decoded by using one of palette and pixel string copying manners, part or all of the new palette colors of the decoded block are added into the shared palette color candidate set.

An embodiment of the disclosure provides an image processing device, which may include:

a first generation unit, arranged to, when copying coding is performed on a current coding block by using one of palette and pixel string copying coding manners, generate a new palette color according to pixels of the current coding block;

a second generation unit, arranged to generate a palette for the current coding block according to the new palette color and/or a palette color candidate set shared by the palette and pixel string copying coding manners; and an encoding unit, arranged to perform palette and pixel string copying coding by using the palette for the current coding block, and generate a video bitstream including a copying manner and a copying parameter.

Another embodiment of the disclosure provides an image processing device, which may include:

a parsing unit, arranged to parse a video bitstream to acquire at least one of: a copying manner for palette and pixel string copying decoding, a copying parameter and new palette color;

a third generation unit, arranged to generate a palette used when palette and pixel string copying decoding is performed on a current decoded block by using the copying manner according to the new palette color and/or a palette color candidate set shared by palette and pixel string copying decoding manners; and a decoding unit, arranged to perform palette and pixel string copying decoding by using the palette for the current decoded block.

An embodiment of the disclosure provides a computer storage medium, which may store a computer program, the computer program being arranged to execute the abovementioned image coding and/or image decoding method(s).

In the technical solutions of the embodiments of the disclosure, image coding includes that: when copying coding is performed on the current coding block by using one of the palette and pixel string copying coding manners, one or more new palette colors are generated according to the pixels of the current coding block; the palette for the current coding block is generated according to the new palette colors and/or the palette color candidate set shared by the palette and pixel string copying coding manners; and palette and pixel string copying coding is performed by using the palette for the current coding block, and the video bitstream including the copying manner and the copying parameter is generated. Image decoding includes that: the video bitstream is parsed to acquire at least one of: the copying manner for palette and pixel string copying decoding, the copying parameter and the new palette colors; the palette used when palette and pixel string copying decoding is performed on the current decoded block by using the copying manner is generated according to the new palette colors and/or the palette color candidate set shared by the palette and pixel string copying decoding manners; and palette and pixel string copying decoding is performed by using the palette for the current decoded block. Thus it can be seen that the embodiments of the disclosure implement image compression with the palette color candidate set shared by multiple copying manners and improve compression efficiency of a multiple palette and pixel string copying manner.

BRIEF DESCRIPTION OF DRAWINGS

In the drawings (which are not necessarily drawn to scale), similar reference signs may describe similar parts in different drawings. Similar reference signs with different letter suffixes may represent different examples of similar parts. The drawings substantially show each embodiment discussed in the disclosure not limitedly but exemplarily.

DETAILED DESCRIPTION

Figure 1:
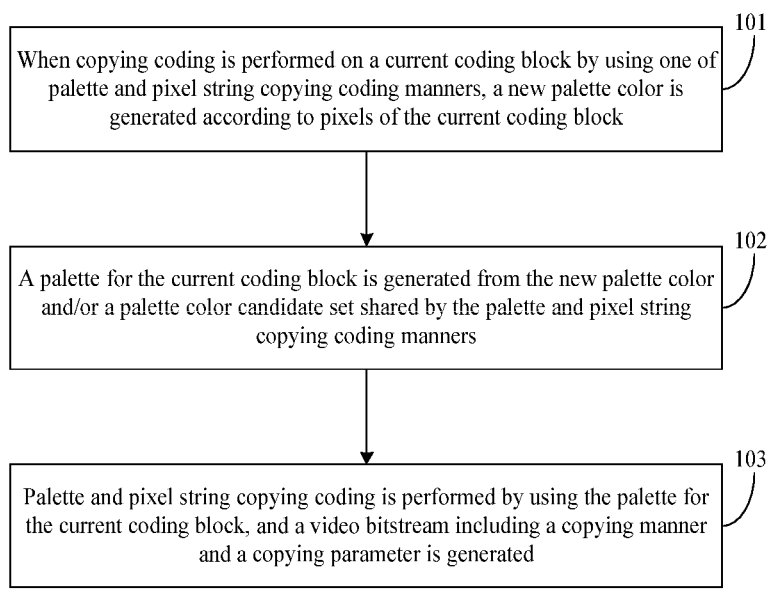
FIG. 1 is a first flowchart of an image coding method according to an embodiment of the disclosure.

In order to make characteristics and technical contents of the embodiments of the disclosure understood in more detail, implementations of the embodiments of the disclosure will be elaborated below in combination with the drawings. The appended drawings are only adopted for description as references and not intended to limit the embodiments of the disclosure.

A natural form of a digital video signal is a sequence of images (or pictures). An image is usually a rectangular region formed by multiple pixels, and a digital video signal is a video image sequence, which is also called as a video sequence or a sequence sometimes for short, formed by dozens of and even hundreds of thousands of images. Coding a digital video signal refers to coding images in the video sequence. At any time, the image which is being coded is called as a current coding image (or current encoding image). Similarly, decoding a video bitstream (called as a bitstream for short) obtained by compressing the digital video signal refers to decode a bitstream of a sequence of images. At any time, the image which is being decoded is called as a current decoding image. The current coding image or the current decoding image is collectively called as a current image.

In almost all international standards for video coding such as Moving Picture Experts Group (MPEG)-1/2/4, H.264/Advanced Video Coding (AVC) and HEVC, when an image is coded (and correspondingly decoded), the image is partitioned into multiple blocks of sub-images with M×M pixels, called as coding blocks (which are decoded blocks from the point of decoding, collectively called as coding and decoded blocks) or "CUs", and sub-images are coded block by block by taking a CU as a basic coding unit. M is usually 4, 8, 16, 32 and 64. Therefore, coding a video sequence refers to sequentially coding CUs of an image. At any time, a CU which is being coded is called as a current coding CU (or current encoding CU). Similarly, decoding a bitstream of a video sequence refers to sequentially decoding CUs of an image to finally reconstruct the whole video sequence. At any time, a CU which is being decoded is called as a current decoding CU. The current coding CU or the current decoding CU is collectively called as a current CU.

In order to achieve adaptability to differences of image contents and properties of a part in an image for effective compression, sizes of CU in the image may be different, some being 8×8, some being 64×64 and the like. In order to seamlessly splice CUs with different sizes, an image is usually partitioned into "LCUs" of the same size containing N×N pixels at first, and then LCU can be further partitioned into multiple tree-structured CUs of maybe different sizes. LCU is also called as "CTU". For example, an image is partitioned into LCUs with the same size of 64×64 pixels (N=64) at first, wherein a certain LCU is further partitioned into three CUs of 32×32 pixels and four CUs of 16×16 pixels, and in such a manner, seven tree-structured CUs form a CTU. Another LCU can be partitioned into two CUs of 32×32 pixels, three CUs of 16×16 pixels and twenty CUs of 8×8 pixels, totally the 25 tree-structured CUs. Coding an image is to sequentially code CUs in LCUs. In the international standard HEVC, LCU and CTU are synonyms. A CU of a size equal to a CTU is called as a CU with a depth 0. CUs obtained by equally partitioning upper, lower, left and right parts of the CU with the depth 0 are called as CUs with depths 1. CUs obtained by equally partitioning upper, lower, left and right parts of a CU with the depth 1 are called as CUs with depths 2. CUs obtained by equally partitioning upper, lower, left and right parts of a CU with the depth 2 are called as CUs with depths 3. At any time, a CTU which is being coded is called as a current coding CTU. At any time, a CTU which is being decoded is called as a current decoding CTU. The current coding CTU or the current decoding CTU is collectively called as a current CTU.

A CU may further be partitioned into multiple sub-regions. The sub-regions include, but not limited to, a PU, a TU and an Asymmetric Multi-Processing (AMP) region.

A color pixel usually consists of three components. Two most common pixel color formats include a Green, Blue and Red (GBR) color format consisting of a green component, a blue component and a red component, and YUV color format consisting of a luma component and two chroma components. Colour formats collectively called as YUV actually include multiple color formats, such as YCbCr color format. When a CU is coded, the CU may be partitioned into three component planes (a G plane, a B plane and an R plane or a Y plane, a U plane and a V plane) which are coded respectively; and three components of a pixel may also be bundled and combined into a triple, and the whole CU formed by these triples is coded. The former pixel and component arrangement manner is called as a planar format of an image (and its CUs), and the latter pixel and component arrangement manner is called as a packed format of the image (and its CUs). A GBR color format and YUV color format of a pixel are both three-component representation formats of the pixel.

Besides a three-component representation format of a pixel, another common representation format of the pixel in a conventional art is a palette index representation format. In the palette index representation format, a numerical value of a pixel may also be represented by an index of a palette. Palette (or palette space) stores numerical values or approximate numerical values of three components of a color of the pixel to be represented. An address of the palette is called as an index of the color of the pixel stored in the address. An index may represent a component of a color of a pixel, and an index may also represent three components of a color of a pixel. There may be one or more palettes. Under the condition that there are multiple palettes, a complete index is actually formed by two parts, i.e. a palette number (representing the specific one in the multiple palettes) and an index of the palette with the palette number. An index representation format of a pixel is to represent the pixel with an index. If not all pixels in an image region (for example, a coding block or a decoded block) may be represented with palette colors (that is, for at least one pixel in the image region, there is no palette color of which three components have numerical values equal to or approximately equal to the pixel and an index thereof), there is usually a special index, called as an escape color and arranged to represent the pixel which may not be represented with a color of a normal palette. Therefore, if an index of a pixel of an index indicates an escape color, three other dedicated components are required to represent a color of the pixel. A normal color and escape color in a palette are both called as palette colors, but the escape color is a virtual color, and there is no physical space for storing this color but a special dedicated virtual index in the palette. An index of an escape color is usually set as the last index of a palette. The index representation format of the pixel is also called as an indexed color or pseudo color representation format of the pixel, or is usually directly called as an indexed pixel or a pseudo pixel or a pixel index or an index. An index is also called as an exponent sometimes. Representing a pixel in an index representation format is also called as indexing or exponentiating.

Other common pixel representation formats include a CMYK representation format and a grayscale representation format.

A YUV color format may also be subdivided into multiple sub-formats according to whether to perform down-sampling on a chroma component or not: a YUV4:4:4 pixel color format under which a pixel is formed by a Y component, a U component and a V component; a YUV4:2:2 pixel color format under which two left and right adjacent pixels are formed by two Y components, a U component and a V component; and a YUV4:2:0 pixel color format under which four left, right, upper and lower adjacent pixels arranged according to 2×2 spatial positions are formed by four Y components, a U component and a V component. A component is usually represented by a number with 8-16 bits. The YUV4:2:2 pixel color format and the YUV4:2:0 pixel color format are both obtained by executing chroma component down-sampling on the YUV4:4:4 pixel color format. A pixel component is also called as a pixel sample, or is simply called as a sample.

A most basic element during coding or decoding may be a pixel, may also be a pixel component, and may further be a pixel index (i.e. indexed pixel). A pixel or pixel component or indexed pixel adopted as the most basic element for coding or decoding is collectively called as a pixel sample, and is also collectively called as a pixel value sometimes or simply called as a sample.

In the embodiments of the disclosure, "pixel sample", "pixel value", "sample", "indexed pixel" and "pixel index" are synonyms, and according to the context, it is clear that whether a "pixel" is represented or "a pixel component" is represented or an "indexed pixel" is represented or any one of the three is simultaneously represented. If it cannot get clear from the context, any one of the three is simultaneously represented.

In the embodiments of the disclosure, a coding block or a decoding block (collectively called as a coding and decoding block) is a region formed by multiple pixels. A shape of the coding and decoding block may be a rectangle, a square, a parallelogram, a trapezoid, a polygon, a round, an ellipse, a string and any other shape. The rectangle also includes a rectangle of which a width or height is one pixel and which is degenerated into a line (i.e. a line segment or a line shape). In an image, coding blocks (or decoding blocks) may have different shapes and sizes. In an image, some or all of coding blocks (or decoding blocks) may have mutually overlapped parts, and all of the coding blocks (or decoding blocks) may also not be overlapped. A coding blocks (or decoding blocks) may be formed by "pixels", may also be formed by "components of the pixels", may also be formed by "indexed pixels", may also be formed by mixing the three, and may further be formed by mixing any two of the three. From the point of video coding or decoding, a coding block (or a decoding block) refers to a region which is coded (or decoded) in an image, including, but not limited to, at least one of: an LCU, a CTU, a CU, a sub-region of the CU, a PU and a TU.

An outstanding characteristic of a computer screen image is that there may usually be many similar and even completely the same pixel patterns in the same image. For example, a Chinese or foreign character frequently appearing in a computer screen image is formed by a few basic strokes, and many similar or the same strokes may be found in the same image. A common menu, icon and the like in a computer screen image also have many similar or the same patterns. Therefore, a copying manner adopted by an image and video compression technology at least includes the following copying manners:

1) Intra block copying, i.e. intra block matching or called as intra motion compensation or called as block matching or called as block copying: a basic operation of block copying coding or decoding is to copy a reference block with the same size (the same number of pixel samples) as a current block from a reconstructed reference pixel sample set for the current coding block or current decoded block (called as the current block) and assign a numerical value of the reference block to the current block. A copying parameter of the block copying manner includes a displacement vector of the current block, which indicates a relative position between the reference block and the current block. A current block has a displacement vector.

2) Intra micro-block copying, i.e. intra micro-block matching or called as micro-block matching or called as micro-block copying: during micro-block copying, a current block (for example, 8×8 pixel samples) is partitioned into multiple micro-blocks (such as micro-blocks with 4×2 pixel samples or micro-blocks with 8×2 pixel samples or micro-blocks with 2×4 pixel samples or micro-blocks with 2×8 pixel samples), and a basic operation of micro-block copying coding or decoding is to copy a reference micro-block from a reconstructed reference pixel sample set for each coding micro-block or decoding micro-block (called as a current micro-block) in the current block and assign a numerical value of the reference micro-block to the current micro-block. A copying parameter of the micro-block copying manner includes a displacement vector of the current micro-block, which indicates a relative position between the reference micro-block and the current micro-block. A current micro-block has a displacement vector. A number of micro-blocks into which a current block is partitioned is equal to a number of displacement vectors.

3) Intra line (called as line (or strip) for short) copying, i.e. intra line matching or called as line matching or called as line copying: a line is a micro-block with a height 1 or a width 1, such as a micro-block with 4×1 or 8×1 or 1×4 or 1×8 pixel samples. A basic operation of line copying coding or decoding is to copy a reference line from a reconstructed reference pixel sample set for a coding line or decoding line (called as a current line for short) in a current block and assign a numerical value of the reference line. Obviously, line copying is a special condition of micro-block copying. A copying parameter of the line copying manner includes a displacement vector of the current line, which indicates a relative position between the reference line and the current line. A current line has a displacement vector. A number of lines into which a current block is partitioned is equal to a number of displacement vectors.

4) Intra string copying, i.e. intra string matching or called as string matching or called as string copying or called as pixel string copying: during pixel string copying, a current coding block or current decoding block (called as a current block) is partitioned into multiple pixel sample strings with variable lengths. Here, a string refers to arranging pixel samples in a two-dimensional region in any shape into a string of which a length is far larger than a width (such as a string of which a width is a pixel sample while a length is 37 pixel samples or a string of which a width is two pixel samples while a length is 111 pixel samples, usually under, but not limited to, the condition that the length is an independent coding or decoding parameter while the width is a parameter which is predetermined or derived from another coding or decoding parameter). A basic operation of string copying coding or decoding is to copy a reference string from a reconstructed reference pixel sample set for a coding string or decoding string (called as a current string for short) in the current block and assign a numerical value of the reference string. A copying parameter of the string copying manner includes a displacement vector and copying length, i.e. copying size, of the current string, which indicate a relative position between the reference string and the current string and a length of the current string, i.e. a number of pixel samples, respectively. The length of the current string is also a length of the reference string. A current string has a displacement vector and a copying length. A number of strings into which a current block is partitioned is equal to a number of displacement vectors and a number of copying lengths. The displacement vector is also called as a copying position, and its representation form includes: a two-dimensional coordinate, a linear address, a distance, a pointer, an index, a number, a mode number and the like.

5) Palette index string copying, i.e. palette or called as index string copying: in palette coding and corresponding decoding manners, a palette is constructed or acquired at first, then part or all of pixels of a current coding block or current decoding block (called as a current block for short) are represented with an index of a palette color in the palette, and the index is coded and decoded, including, but not limited to: partitioning a current block into multiple variable-length index strings for index string copying coding and decoding. A basic operation of index string copying coding and decoding is to copy a reference index string from an indexed reconstructed reference pixel sample set for an index coding string or index decoding string (called as a current index string for short) in the current block and assign an index numerical value of the reference index string to a current index string. A copying parameter of the index string copying manner includes a displacement vector and copying length, i.e. copying size, of the current index string, which indicate a relative position between the reference index string and the current index string and a length, i.e. a number of corresponding pixel samples, of the current index string respectively. The length of the current index string is also a length of the reference index string. A current index string has a displacement vector and a copying length. A number of index strings into which a current block is partitioned is equal to a number of displacement vectors and a number of copying lengths. The displacement vector is also called as a copying position, and its representation form includes one or more of the followings: a two-dimensional coordinate, a linear address, a distance, a pointer, an index, a number, a mode number and the like. In the palette index string copying manner, a copied reference pixel is extracted from the palette. Therefore, an index string is also called as a palette color string or a palette pixel string or a palette string, and the index string copying manner is also called as a palette copying manner or a palette manner. In the palette manner, a string is also called as a run or a run length. Therefore, an index string is also called as an index run or an index run length or called as a run or a run length for short. A palette color of a current block is sourced from a pixel color of the current block and/or a palette color candidate set, and the palette color candidate set is formed by accumulating part of palette colors of coding and decoding blocks which have been coded and decoded.

6) A mixed copying manner mixing index string copying and pixel string copying, called as an index-pixel string mixed copying manner for short, also called as a palette-pixel string mixed copying manner or a palette manner mixing pixel string copying or a pixel string copying manner mixing a palette or a palette and pixel string copying manner: when a current coding block or current decoding block (called as a current block for short) is coded or decoded, a pixel string copying manner is adopted for part or all of pixels, and an index copying manner, i.e. a palette manner extracting a reference pixel from a palette, is adopted for part or all of the pixels.

7) A multiple palette and pixel string copying manner combining multiple palette and pixel string copying manners: at least two different palette and pixel string copying manners are adopted for coding and decoding. Different palette and pixel string copying manners adopt different mixing solutions to mix palette copying and pixel string copying. In an image, a palette and pixel string copying manner of a mixing solution I is adopted for part of coding/decoding blocks, a palette and pixel string copying manner of a mixing solution II is adopted for part of coding/decoding blocks, a palette and pixel string copying manner of a mixing solution III is adopted for part of coding/decoding blocks, and the like. Different mixing solutions may be different mainly in the following aspects: 1) a number of sorts of strings, 2) a value range of a parameter, 3) (a) value range(s) of one or multiple copying parameters, 4) a value range of a copying position, i.e. a displacement vector, 5) a position of a current index or a current pixel, 6) a position of a current sample segment, 7) a position of a reference index or a reference pixel, 8) a position of a reference sample segment, and 9) a copying shape.

Other copying manners further include a rectangular copying manner, a copying manner mixing multiple copying manners and the like.

A block in the block copying manner, a micro-block in the micro-block copying manner, a line in the line copying manner, a string in the string copying manner, a rectangle in the rectangular copying manner and a pixel index string in the palette index manner are collectively called as pixel sample segments, also called as sample segments for short. A basic element of a sample segment is a pixel or a pixel component or a pixel index. A sample segment has a copying parameter, arranged to represent a relationship between a current pixel sample segment and a reference pixel sample segment. Therefore, a sample segment is a minimum unit of a copying operation with the same copying relationship. A copying parameter includes multiple copying parameter components, the copying parameter components at least including: a displacement vector horizontal component, a displacement vector vertical component, a one-dimensional displacement vector, a linear address, a relative linear address, an index, a palette linear address, a relative index, a palette relative linear address, a copying length, a copying width, a copying height, a rectangle width, a rectangle length and an unmatched pixel (also called as a reference-free pixel, i.e. a non-copying pixel which is not copied from another place).

In each copying manner, pixel samples or indexes are required to be arranged according to a certain sequence. An arrangement manner is also called as a scanning manner.

The scanning manner may be partitioned into the following manners according to a path shape.

A) A horizontal Z-shaped scanning manner, also called as a horizontal raster scanning manner: pixel samples or indexes of a coding block or decoding block (collectively called as a coding/decoding block) are arranged in rows, and are arranged in all the rows according to the same direction (all from left to right or all from right to left). The rows may be arranged from top to bottom, and may also be arranged from bottom to top.

B) A vertical Z-shaped scanning manner, also called as a vertical raster scanning manner: pixel samples or indexes of a coding block or decoding block (collectively called as a coding/decoding block) are arranged in columns, and are arranged in all the columns according to the same direction (all from top to bottom or all from bottom to top). The columns may be arranged from left to right, and may also be arranged from right to left.

C) A horizontal arched scanning manner: pixel samples or indexes of a coding block or decoding block (collectively called as a coding/decoding block) are arranged in rows, are arranged in the odd rows according to a direction (for example: from left to right), and are arranged in the even rows according to another (opposite) direction (for example: from right to left). The rows may be arranged from top to bottom, and may also be arranged from bottom to top.

D) A vertical arched scanning manner: pixel samples or indexes of a coding block or decoding block (collectively called as a coding/decoding block) are arranged in columns, are arranged in the odd columns according to a direction (for example: from top to bottom), and are arranged in the even columns according to another (opposite) direction (for example: from bottom to top). The columns may be arranged from left to right, and may also be arranged from right to left.

In a string copying (index string copying or pixel string copying or index spring-pixel string mixed copying) manner, there are the following two basic copying manners.

I) A one-dimensional linear copying shape: each of a current string and a reference string is a one-dimensional sample string formed in a coding/decoding block according to a sequence of a predetermined scanning manner, and has an equal length, but two-dimensional regions formed by the two strings respectively may not have the same two-dimensional shape.

II) a two-dimensional conformal copying shape: a current string is arranged in a current coding/decoding block according to a sequence of a predetermined scanning manner, and a reference string and the current string keep completely the same two-dimensional shape, and have an equal length.

Each above basic copying shape may further be partitioned into multiple copying shapes according to a specific scanning manner, for example, a vertical arched one-dimensional linear copying shape and a horizontal Z-shaped two-dimensional conformal copying shape.

It is important to note that "copying" is a reconstruction and decoding operation, and a corresponding decoding operation is "matching". Therefore, each copying manner, for example, a block matching manner, a micro-block copying manner, a line copying manner, a pixel string copying manner and an index string copying manner, is also called as a block matching manner, a micro-block matching manner, a line matching manner, a pixel string matching manner, an index string matching manner and the like.

Among the copying manners, the multiple palette and pixel string copying manner achieves the best compression effect. However, in the multiple palette and pixel string copying manner of a conventional art, each palette and pixel string copying manner has a respectively independent palette color candidate set, and if a coding/decoding block does not adopt a palette and pixel string copying manner, a palette color candidate set corresponding to the palette and pixel string copying manner may not be updated, and there is no new more suitable palette color supplemented to the corresponding palette color candidate set. Such a method greatly reduces compression efficiency of the multiple palette and pixel string copying manner.

On such a basis, the embodiments of the disclosure provide image coding and decoding methods and image processing devices. When a coding/decoding block is coded/decoded, regardless of the specific palette and pixel string copying manner which is adopted, part or all of new palette colors are placed in a shared palette color candidate set. When a subsequent coding/decoding block is coded/decoded, a palette and pixel string copying manner generates a respective palette from pixels of the current coding/decoding block and/or the shared palette color candidate set. The palette color candidate set is also called as a palette predictor or a palette prediction set.

In the embodiments of the disclosure, a maximum number of palette colors which may be accommodated in a largest space of the palette color candidate set is a predetermined constant. In the embodiments of the disclosure, the palette color candidate set is updated according to a predetermined rule. In the embodiments of the disclosure, existing palette colors of the palette color candidate set are deleted according to the predetermined rule. In the embodiments of the disclosure, positions of palette colors of the palette color candidate set are regulated according to the predetermined rule, that is, their addresses or pointers are changed. In the embodiments of the disclosure, one or more new palette colors are added into the palette color candidate set according to the predetermined rule. In the embodiments of the disclosure, addition of the new palette colors and/or deletion of the existing palette colors are/is performed on the palette color candidate set according to a first-in-first-out rule. In the embodiments of the disclosure, one of the multiple palette and pixel string copying manners is optionally a pure palette copying manner. In the embodiments of the disclosure, any coding/decoding block is only required to be coded/decoded by using one of the palette and pixel string copying manners, and part or all of newly generated palette colors of the coding/decoding block are added into the shared palette color candidate set.

FIG. 1 is a first flowchart of an image coding method according to an embodiment of the disclosure. In the embodiment of the disclosure, when copying coding is performed on a current coding block by using one of palette and pixel string copying coding manners, one or more new palette colors are generated from pixels of the current coding block, a palette for the current coding block is generated from the new palette colors and/or a palette color candidate set shared by the palette and pixel string copying coding manners, palette and pixel string copying coding is performed by using the palette for the current coding block, and a video bitstream including a copying manner and a copying parameter is generated. As shown in FIG. 1, the image coding method includes the following steps.

In Step 101, when copying coding is performed on a current coding block by using one of palette and pixel string copying coding manners, one or more new palette colors are generated according to pixels of the current coding block.

In Step 102, a palette for the current coding block is generated from the new palette colors and/or a palette color candidate set shared by the palette and pixel string copying coding manners.

In Step 103, palette and pixel string copying coding is performed by using the palette for the current coding block, and a video bitstream including a copying manner and a copying parameter is generated.

In the solution of the embodiment of the disclosure, the coding block is a coding region of an image, and the coding block includes at least one of: an LCU, a CTU, a CU, a sub-region of the CU, a PU and a TU.

In the solution of the embodiment of the disclosure, the video bitstream further includes the new palette colors.

In the solution of the embodiment of the disclosure, palette and pixel string copying manners optionally have respective palettes.

In the solution of the embodiment of the disclosure, a maximum number of palette colors which may be accommodated by a largest space of the palette color candidate set is a predetermined constant.

In the solution of the embodiment of the disclosure, one or more of the following operations are performed on the palette color candidate set according to a predetermined rule:

updating, palette color deletion, palette color position regulation and palette color addition.

In an implementation mode, addition of new palette colors and/or deletion of existing palette colors are/is performed on the palette color candidate set according to a first-in-first-out rule.

In the solution of the embodiment of the disclosure, one of the multiple palette and pixel string copying manners is optionally a pure palette copying manner.

In the solution of the embodiment of the disclosure, for the coding block coded by using one of palette and pixel string copying manners, part or all of the new palette colors of the coding block are added into the shared palette color candidate set.

Figure 2:
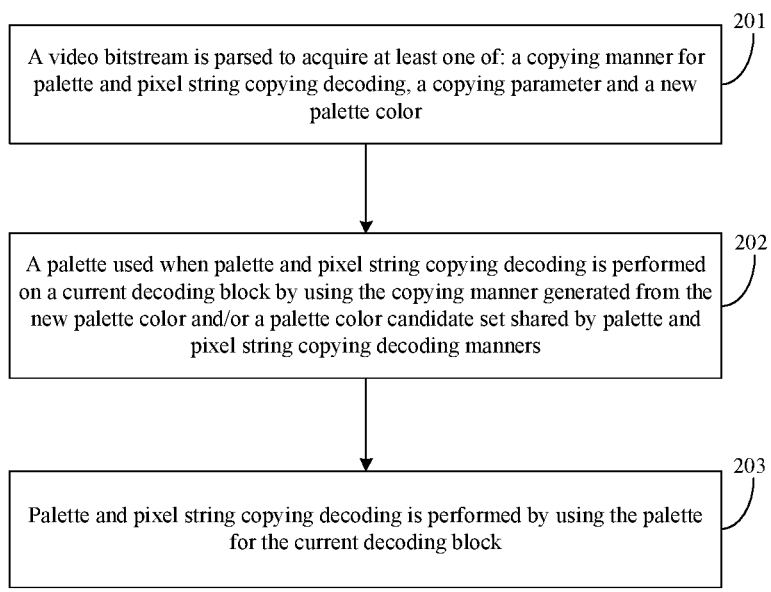
FIG. 2 is a first flowchart of an image decoding method according to an embodiment of the disclosure.

FIG. 2 is a first flowchart of an image decoding method according to an embodiment of the disclosure. In the embodiment of the disclosure, a video bitstream is parsed to acquire at least one of: a copying manner for palette and pixel string copying decoding, a copying parameter and one or more new palette colors, and a palette used when palette and pixel string copying decoding is performed on a current decoding block by using the copying manner is generated from the new palette colors and/or a palette color candidate set shared by palette and pixel string copying decoding manners. As shown in FIG. 2, the image decoding method includes the following steps.

In Step 201, a video bitstream is parsed to acquire at least one of: a copying manner for palette and pixel string copying decoding, a copying parameter and one or more new palette colors.

In Step 202, a palette used when palette and pixel string copying decoding is performed on a current decoded block by using the copying manner is generated from the new palette colors and/or a palette color candidate set shared by palette and pixel string copying decoding manners.

In Step 203, palette and pixel string copying decoding is performed by using the palette for the current decoded block.

In the solution of the embodiment of the disclosure, the decoded block is a decoding region of an image, and the decoded block includes at least one of: an LCU, a CTU, a CU, a sub-region of the CU, a PU and a TU.

In the solution of the embodiment of the disclosure, palette and pixel string copying manners optionally have respective palettes.

In the solution of the embodiment of the disclosure, a maximum number of palette colors which may be accommodated by a largest space of the palette color candidate set is a predetermined constant.

In the solution of the embodiment of the disclosure, one or more of the following operations are performed on the palette color candidate set according to a predetermined rule:

updating, palette color deletion, palette color position regulation and palette color addition.

In an implementation mode, addition of new palette colors and/or deletion of existing palette colors are/is performed on the palette color candidate set according to a first-in-first-out rule.

In the solution of the embodiment of the disclosure, one of the multiple palette and pixel string copying manners is optionally a pure palette copying manner.

In the solution of the embodiment of the disclosure, for the decoded block decoded by using one of palette and pixel string copying manners, part or all of the new palette colors of the decoded block are added into the shared palette color candidate set.

The technical solutions of the embodiments of the disclosure are applied to coding and decoding of a packed format image, and the technical solutions of the embodiments of the disclosure are also applied to coding and decoding of a component planar format image.

Figure 3:
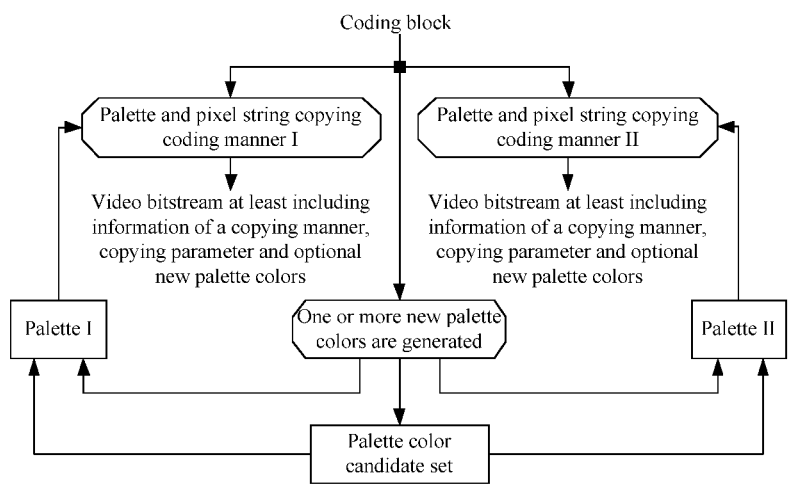
FIG. 3 is a second flowchart of an image coding method according to an embodiment of the disclosure.

FIG. 3 is a second flowchart of an image coding method according to an embodiment of the disclosure.

As shown in FIG. 3, when copying coding is performed on a current coding block by using one of palette and pixel string copying coding manners, one or more new palette colors are generated from pixels of the current coding block, a palette for the current coding block is generated from the new palette colors and/or a palette color candidate set shared by the palette and pixel string copying coding manners, palette and pixel string copying coding is performed by using the palette for the current coding block, and a video bitstream including a copying manner and a copying parameter is generated. In an implementation mode, the video bitstream includes the new palette colors. In an implementation mode, the palette and pixel string copying coding manners optionally have respective palettes. In an implementation mode, a maximum number of palette colors which may be accommodated by a largest space of the palette color candidate set is a predetermined constant. In an implementation mode, the palette color candidate set is updated according to a predetermined rule. In an implementation mode, existing palette colors of the palette color candidate set are deleted according to the predetermined rule. In an implementation mode, positions of palette colors of the palette color candidate set are regulated according to the predetermined rule, that is, their addresses or pointers are changed. In an implementation mode, the new palette colors are added into the palette color candidate set according to the predetermined rule. In an implementation mode, addition of the new palette colors and/or deletion of the existing palette colors are/is performed on the palette color candidate set according to a first-in-first-out rule. In an implementation mode, one of the multiple palette and pixel string copying coding manners is optionally a pure palette copying coding manner. In an implementation mode, any coding block is only required to be coded by using one of the palette and pixel string copying coding manners, and part or all of newly generated palette colors of the coding block are added into the shared palette color candidate set.

Figure 4:
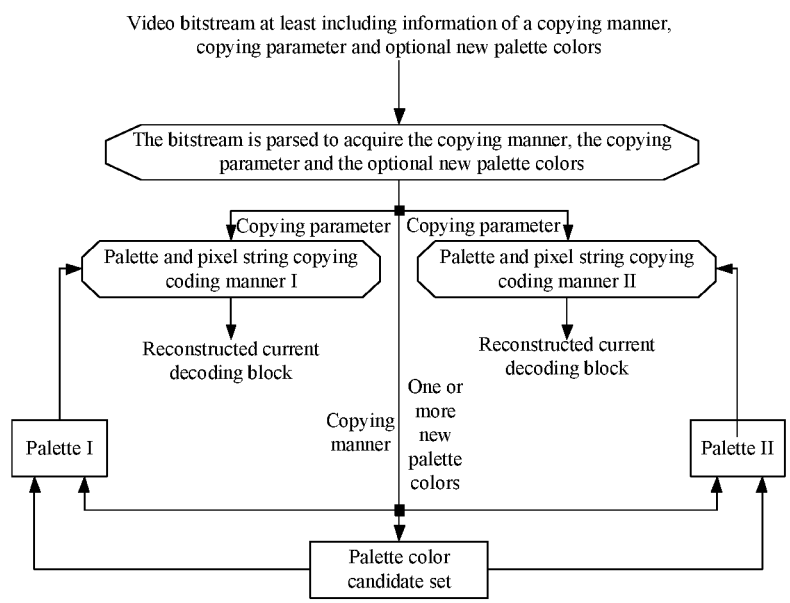
FIG. 4 is a second flowchart of an image decoding method according to an embodiment of the disclosure.

FIG. 4 is a second flowchart of an image decoding method according to an embodiment of the disclosure. As shown in FIG. 4, a video bitstream is parsed to acquire at least one of: a copying manner for palette and pixel string copying decoding, a copying parameter and one or more new palette colors, and a palette used when palette and pixel string copying decoding is performed on a current decoding block by using the copying manner is generated from the new palette colors and/or a palette color candidate set shared by palette and pixel string copying decoding manners. In an implementation mode, the video bitstream includes the new palette colors. In an implementation mode, the palette and pixel string copying decoding manners optionally have respective palettes. In an implementation mode, a maximum number of palette colors which may be accommodated by a largest space of the palette color candidate set is a predetermined constant. In an implementation mode, the palette color candidate set is updated according to a predetermined rule. In an implementation mode, existing palette colors of the palette color candidate set are deleted according to the predetermined rule. In an implementation mode, positions of palette colors of the palette color candidate set are regulated according to the predetermined rule, that is, their addresses or pointers are changed. In an implementation mode, the new palette colors are added into the palette color candidate set according to the predetermined rule. In an implementation mode, addition of the new palette colors and/or deletion of the existing palette colors are/is performed on the palette color candidate set according to a first-in-first-out rule. In an implementation mode, one of the multiple palette and pixel string copying decoding manners is optionally a pure palette copying decoding manner. In an implementation mode, a decoding block is only required to be decoded by using one of the palette and pixel string copying decoding manners, and part or all of newly generated palette colors of the decoded block are added into the shared palette color candidate set.

Figure 5:
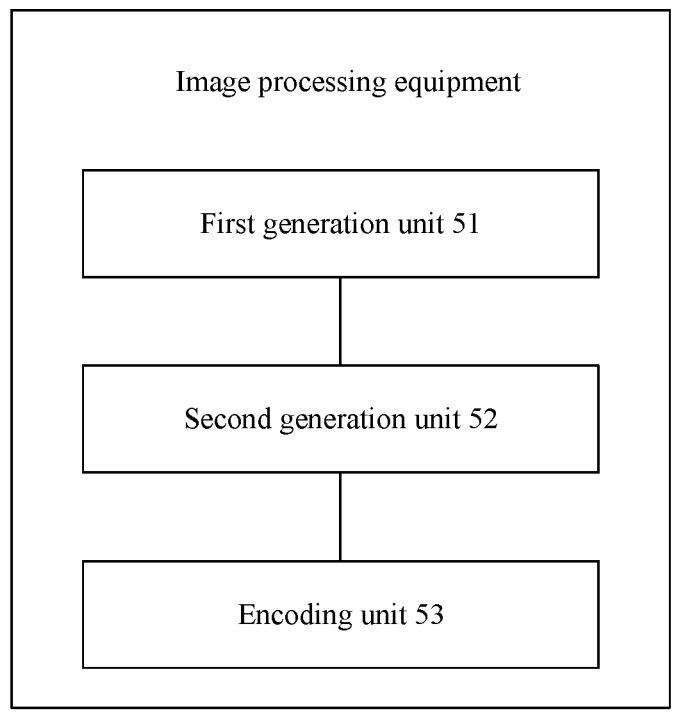
FIG. 5 is a first structure diagram of an image processing device according to an embodiment of the disclosure.

FIG. 5 is a first structure diagram of an image processing device according to an embodiment of the disclosure. The image processing device may code the image. As shown in FIG. 5, the image processing device includes:

a first generation unit 51, arranged to, when copying coding is performed on a current coding block by using one of palette and pixel string copying coding manners, generate one or more new palette colors according to pixels of the current coding block;

a second generation unit 52, arranged to generate a palette for the current coding block according to the new palette colors and/or a palette color candidate set shared by the palette and pixel string copying coding manners; and an encoding unit 53, arranged to perform palette and pixel string copying coding by using the palette for the current coding block, and generate a video bitstream including a copying manner and a copying parameter.

In an implementation mode, the video bitstream includes the one or more new palette colors. In an implementation mode, the palette and pixel string copying coding manners optionally have respective palettes. In an implementation mode, a maximum number of palette colors which may be accommodated by a largest space of the palette color candidate set is a predetermined constant. In an implementation mode, the palette color candidate set is updated according to a predetermined rule. In an implementation mode, existing palette colors of the palette color candidate set are deleted according to the predetermined rule. In an implementation mode, positions of palette colors of the palette color candidate set are regulated according to the predetermined rule, that is, their addresses or pointers are changed. In an implementation mode, the one or more new palette colors are added into the palette color candidate set according to the predetermined rule. In an implementation mode, addition of the one or more new palette colors and/or deletion of the existing palette color are/is performed on the palette color candidate set according to a first-in-first-out rule. In an implementation mode, one of the multiple palette and pixel string copying coding manners is optionally a pure palette copying coding manner. In an implementation mode, a coding block is only required to be coded by using one of the palette and pixel string copying coding manners, and part or all of newly generated palette colors of the coding block are added into the shared palette color candidate set.

Those skilled in the art should know that a function realized by each unit in the image processing device shown in FIG. 5 may be understood with reference to the related descriptions of the image coding method. The function of each unit in the image processing device shown in FIG. 5 may be realized through a program running on a processor, and may also be realized through a specific logic circuit.

During a practical application, the function realized by a unit in the image processing device may be carried out through a Central Processing Unit (CPU), or Micro Processor Unit (MPU), Digital Signal Processor (DSP), Field Programmable Gate Array (FPGA) and the like located in the image processing device.

Figure 6:
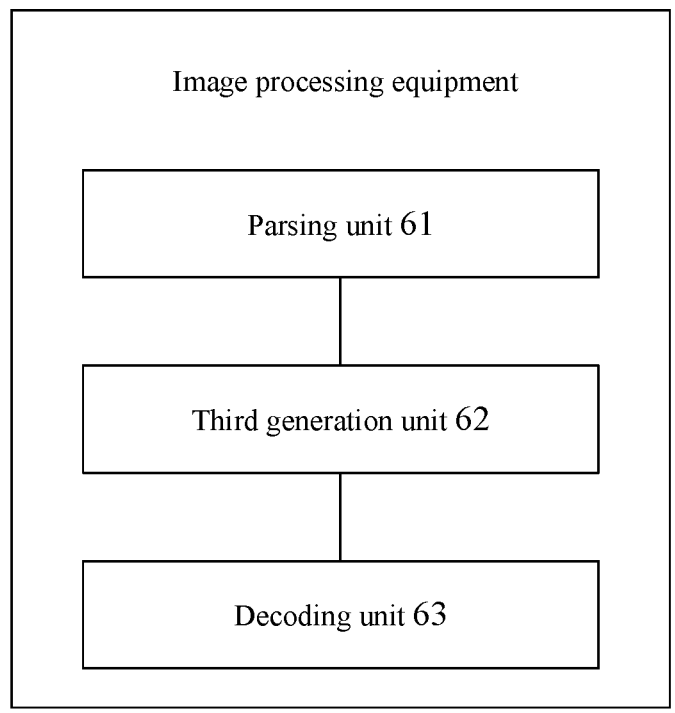
FIG. 6 is a second structure diagram of an image processing device according to an embodiment of the disclosure.

FIG. 6 is a second structure diagram of an image processing device according to an embodiment of the disclosure. The image processing device may decode an image. As shown in FIG. 6, the image processing device includes:

a parsing unit 61, arranged to parse a video bitstream to acquire at least one of: a copying manner for palette and pixel string copying decoding, a copying parameter and one or more new palette colors;

a third generation unit 62, arranged to generate a palette used when palette and pixel string copying decoding is performed on a current decoded block by using the copying manner according to the new palette colors and/or a palette color candidate set shared by palette and pixel string copying decoding manners; and a decoding unit 63, arranged to perform palette and pixel string copying decoding by using the palette for the current decoded block.

In an implementation mode, the video bitstream includes the one or more new palette colors. In an implementation mode, the palette and pixel string copying decoding manners optionally have respective palettes. In an implementation mode, a maximum number of palette colors which may be accommodated by a largest space of the palette color candidate set is a predetermined constant. In an implementation mode, the palette color candidate set is updated according to a predetermined rule. In an implementation mode, existing palette colors of the palette color candidate set are deleted according to the predetermined rule. In an implementation mode, positions of palette colors of the palette color candidate set are regulated according to the predetermined rule, that is, their addresses or pointers are changed. In an implementation mode, the new palette colors are added into the palette color candidate set according to the predetermined rule. In an implementation mode, addition of the new palette colors and/or deletion of the existing palette colors are/is performed on the palette color candidate set according to a first-in-first-out rule. In an implementation mode, one of the multiple palette and pixel string copying decoding manners is optionally a pure palette copying decoding manner. In an implementation mode, a decoding block is only required to be decoded by using one of the palette and pixel string copying decoding manners, and part or all of newly generated palette colors of the decoded block are added into the shared palette color candidate set.

Those skilled in the art should know that a function realized by each unit in the image processing device shown in FIG. 6 may be understood with reference to the related descriptions of the image coding method. The function of each unit in the image processing device shown in FIG. 6 may be realized through a program running on a processor, and may also be realized through a specific logic circuit.

During a practical application, the function realized by each unit in the image processing device may be realized through a CPU, or MPU, DSP, FPGA and the like located in the image processing device.

Figure 7:
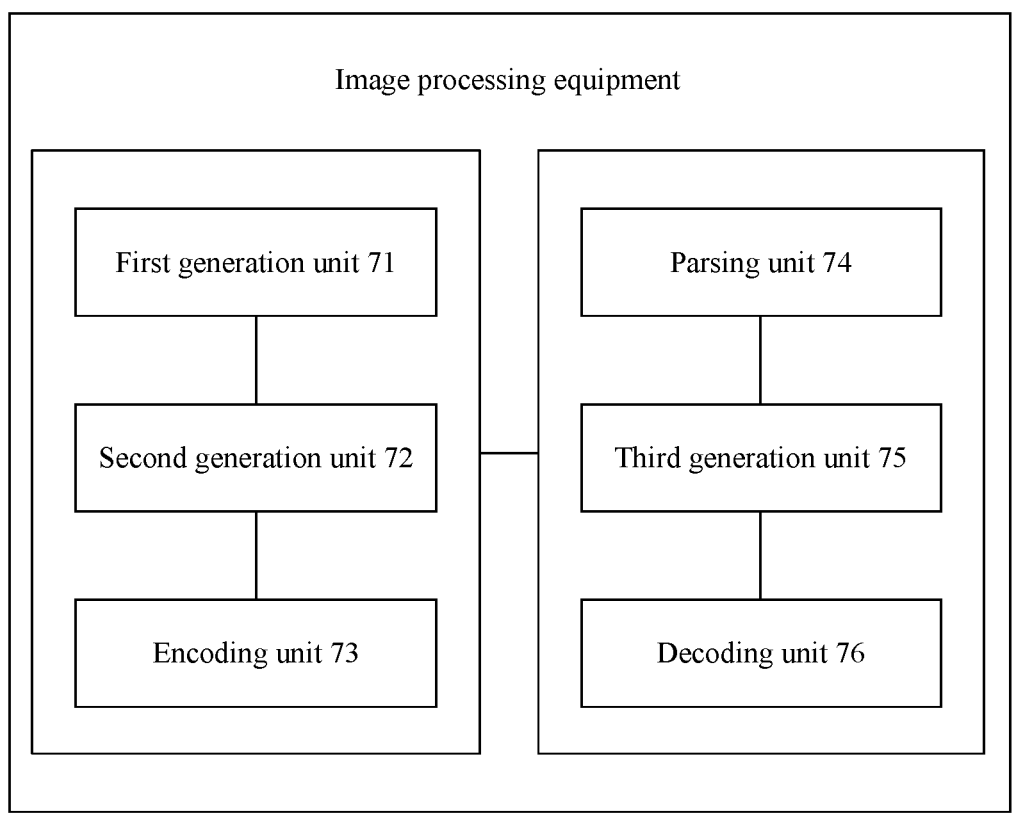
FIG. 7 is a third structure diagram of an image processing device according to an embodiment of the disclosure.

FIG. 7 is a third structure diagram of an image processing device according to an embodiment of the disclosure. The image processing device may code and decode an image. As shown in FIG. 7, the image processing device includes:

a first generation unit 71, arranged to, when copying coding is performed on a current coding block by using one of palette and pixel string copying coding manners, generate one or more new palette colors according to pixels of the current coding block;

a second generation unit 72, arranged to generate a palette for the current coding block according to the new palette colors and/or a palette color candidate set shared by the palette and pixel string copying coding manners;

an encoding unit 73, arranged to perform palette and pixel string copying coding by using the palette for the current coding block, and generate a video bitstream including a copying manner and a copying parameter;

a parsing unit 74, arranged to parse a video bitstream to acquire at least one of: a copying manner for palette and pixel string copying decoding, a copying parameter and new palette colors;

a third generation unit 75, arranged to generate a palette used when palette and pixel string copying decoding is performed on a current decoded block by using the copying manner according to the new palette colors and/or a palette color candidate set shared by palette and pixel string copying decoding manners; and a decoding unit 76, arranged to perform palette and pixel string copying decoding by using the palette for the current decoded block.

During a practical application, a function realized by each unit in the image processing device may be realized through a CPU, or MPU, DSP, FPGA and the like located in the image processing device.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

When being implemented in form of software function module and sold or used as an independent product, the image processing device of the embodiments of the disclosure may also be stored in a computer-readable storage medium. Based on such an understanding, the technical solutions of the embodiments of the disclosure substantially or parts making contributions to a conventional art may be embodied in form of software product, and the computer software product is stored in a storage medium, including multiple instructions arranged to enable computer equipment (which may be a personal computer, a server, network equipment or the like) to execute all or part of the methods in each embodiment of the disclosure. The abovementioned storage medium includes: various media capable of storing program codes such as a U disk, a mobile hard disk, a Read-Only Memory (ROM), a magnetic disk or an optical disk. Therefore, the embodiments of the disclosure are not limited to any specific hardware and software combination.

Correspondingly, the embodiments of the disclosure further provide a computer storage medium, in which a computer program is stored, the computer program being arranged to execute an image coding method and/or image decoding method of the embodiments of the disclosure.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of protection of the disclosure.

INDUSTRIAL APPLICABILITY

According to the solutions of the embodiments of the disclosure, when copying coding is performed on the current coding block by using one of the palette and pixel string copying coding manners, the one or more new palette colors are generated according to the pixels of the current coding block; the palette for the current coding block is generated according to the new palette colors and/or the palette color candidate set shared by the palette and pixel string copying coding manners; and palette and pixel string copying coding is performed by using the palette for the current coding block, and the video bitstream including the copying manner and the copying parameter is generated. The video bitstream is parsed to acquire at least one of: the copying manner for palette and pixel string copying decoding, the copying parameter and the new palette colors; the palette used when palette and pixel string copying decoding is performed on the current decoding block by using the copying manner is generated according to the new palette colors and/or the palette color candidate set shared by the palette and pixel string copying decoding manners; and palette and pixel string copying decoding is performed by using the palette for the current decoding block. Image compression with the palette color candidate set shared by multiple copying manners is implemented, and compression efficiency of a multiple palette and pixel string copying manner is improved.

The invention claimed is:

1. An image coding method, applied to an application scenario where a multiple palette and pixel string copying manner combining at least two different palette and pixel string copying coding manners is used to perform copying coding on an image, wherein a palette and pixel string copying coding manner is one mixed copying manner that a pixel string copying manner is adopted for part of pixels of a current coding block and a palette coding manner is adopted for of all pixels of the current coding block, the at least two different palette and pixel string copying coding manners are selected from a group consisting at least two of: a number of sorts of strings, a value range of a parameter, a value range of a copying parameter, a value range of a copying position, a position of a current index or a current pixel, a position of a current sample segment, a position of a reference index or a reference pixel, a position of a reference sample segment, or a copying shape; wherein the method comprises:
when copying coding is performed on the current coding block by using one of the at least two different palette and pixel string copying coding manners, generating a new palette color according to pixels of the current coding block;
generating a palette for the current coding block according to the new palette color and a palette color candidate set shared by the at least two different palette and pixel string copying coding manners; and
performing palette and pixel string copying coding by using the palette for the current coding block, and generating a video bitstream comprising a copying manner and a copying parameter.

2. The image coding method according to claim 1, wherein the coding block is a coding region of an image, and the coding block comprises at least one of: a Largest Coding Unit (LCU), a Coding Tree Unit (CTU), a Coding Unit (CU), a sub-region of the CU, a Prediction Unit (PU) and a Transform Unit (TU).

3. The image coding method according to claim 1, wherein the video bitstream further comprises the new palette color.

4. The image coding method according to claim 1, wherein a maximum number of palette colors which are capable of being accommodated by a largest space of the palette color candidate set is a predetermined constant.

5. The image coding method according to claim 1, further comprising: performing one or more of the following operations on the palette color candidate set according to a predetermined rule:
updating, palette color deletion, palette color position regulation and palette color addition.

6. The image coding method according to claim 5, wherein addition of the new palette color and/or deletion of existing palette colors are/is performed on the palette color candidate set according to a first-in-first-out rule.

7. The image coding method according to claim 1, further comprising:
for the coding block coded by using one of palette and pixel string copying manners, adding part or all of the new palette color of the coding block into the shared palette color candidate set.

8. An image decoding method, applied to an application scenario where a multiple palette and pixel string copying manner combining at least two different palette and pixel string copying decoding manners is used to perform copying decoding on an image, wherein a palette and pixel string copying decoding manner is one mixed copying manner that a pixel string copying manner is adopted for part of pixels of a current coding block and a palette coding manner is adopted for part of all pixels of the current coding block, the at least two different palette and pixel string copying coding manners are selected from a group consisting at least two of: a number of sorts of strings, a value range of a parameter, a value range of a copying parameter, a value range of a copying position, a position of a current index or a current pixel, a position of a current sample segment, a position of a reference index or a reference pixel, a position of a reference sample segment, or a copying shape; wherein the method comprises:
parsing a video bitstream to acquire at least one of: a copying manner for palette and pixel string copying decoding, a copying parameter and a new palette color;
generating a palette used when palette and pixel string copying decoding is performed on the current decoding block by using the copying manner, according to the new palette color and a palette color candidate set shared by the at least two different palette and pixel string copying decoding manners; and
performing palette and pixel string copying decoding by using the palette for the current decoding block.

9. The image decoding method according to claim 8, wherein the decoding block is a decoding region of an image, and the decoding block comprises at least one of: a Largest Coding Unit (LCU), a Coding Tree Unit (CTU), a Coding Unit (CU), a sub-region of the CU, a Prediction Unit (PU) and a Transform Unit (TU).

10. The image decoding method according to claim 8, wherein a maximum number of palette colors which are capable of being accommodated by a largest space of the palette color candidate set is a predetermined constant.

11. The image decoding method according to claim 8, further comprising: performing one or more of the following operations on the palette color candidate set according to a predetermined rule:
updating, palette color deletion, palette color position regulation and palette color addition.

12. The image decoding method according to claim 11, wherein addition of the new palette color and/or deletion of existing palette colors are/is performed on the palette color candidate set according to a first-in-first-out rule.

13. The image decoding method according to claim 8, further comprising:
for the decoding block decoded by using one of palette and pixel string copying manners, adding part or all of the new palette color of the decoding block into the shared palette color candidate set.

14. A coding device, comprising: a memory and a processor; wherein the processor is configured to execute at least one program stored in the memory to perform the method of claim 1.

15. A decoding device, applied to an application scenario where a multiple palette and pixel string copying manner combining at least two different palette and pixel string copying decoding manners is used to perform copying decoding on an image, wherein a palette and pixel string copying decoding manner is one mixed copying manner that a pixel string copying manner is adopted for part of pixels of a current coding block and a palette coding manner is adopted for part of all pixels of the current coding block, the at least two different palette and pixel string copying coding manners are selected from a group consisting at least two of: a number of sorts of strings, a value range of a parameter, a value range of a copying parameter, a value range of a copying position, a position of a current index or a current pixel, a position of a current sample segment, a position of a reference index or a reference pixel, a position of a reference sample segment, or a copying shape; wherein the device comprises:
- a processor; and
- a memory for storing a set of instructions executable by the processor, wherein when the instructions are executed by the processor, the processor is arranged to:
- parse a video bitstream to acquire at least one of: a copying manner for palette and pixel string copying decoding, a copying parameter and new palette color;
- generate a palette used when palette and pixel string copying decoding is performed on the current decoding block by using the copying manner according to the new palette color and a palette color candidate set shared by the at least two different palette and pixel string copying decoding manners; and
- perform palette and pixel string copying decoding by using the palette for the current decoding block.

16. The decoding device according to claim 15, wherein the decoding block is a decoding region of an image, and the decoding block comprises at least one of: a Largest Coding Unit (LCU), a Coding Tree Unit (CTU), a Coding Unit (CU), a sub-region of the CU, a Prediction Unit (PU) and a Transform Unit (TU).

17. The decoding device according to claim 15, wherein a maximum number of palette colors which are capable of being accommodated by a largest space of the palette color candidate set is a predetermined constant.

18. The decoding device according to claim 15, wherein the processor is further arranged to: perform one or more of the following operations on the palette color candidate set according to a predetermined rule:
- updating, palette color deletion, palette color position regulation and palette color addition.

19. The decoding device according to claim 18, wherein addition of the new palette color and/or deletion of existing palette colors are/is performed on the palette color candidate set according to a first-in-first-out rule.

20. The decoding device according to claim 15, wherein the processor is further arranged to:
for the decoding block decoded by using one of palette and pixel string copying manners, add part or all of the new palette color of the decoding block into the shared palette color candidate set.

* * * * *